March 3, 1970　　　E. HAGENBUCH　　　3,498,509

APPARATUS FOR TYING A RIBBON BOW

Filed July 17, 1968　　　　　　　　　　　7 Sheets-Sheet 1

INVENTOR.
ERNST HAGENBUCH
BY Kelman and Berman
AGENTS

March 3, 1970  E. HAGENBUCH  3,498,509
APPARATUS FOR TYING A RIBBON BOW
Filed July 17, 1968  7 Sheets-Sheet 2

INVENTOR.
ERNST HAGENBUCH
BY Kelman and German
AGENTS

March 3, 1970    E. HAGENBUCH    3,498,509
APPARATUS FOR TYING A RIBBON BOW
Filed July 17, 1968    7 Sheets-Sheet 3

INVENTOR.
ERNST HAGENBUCH
BY Kelman and Berman
AGENTS

Fig. 5

March 3, 1970     E. HAGENBUCH     3,498,509
APPARATUS FOR TYING A RIBBON BOW
Filed July 17, 1968     7 Sheets-Sheet 6

INVENTOR.
ERNST HAGENBUCH
BY Kelman and Berman
AGENTS

United States Patent Office 3,498,509
Patented Mar. 3, 1970

3,498,509
APPARATUS FOR TYING A RIBBON BOW
Ernst Hagenbuch, Breitenbach, Switzerland, assignor to The Breitenbach Ribbon Manufacturing Co. Ltd., Breitenbach, Switzerland
Filed July 17, 1968, Ser. No. 745,562
Int. Cl. B67d 5/22
U.S. Cl. 223—46      12 Claims

ABSTRACT OF THE DISCLOSURE

A semi-automatic pneumatically operated machine for tying ribbon bows has a collet for clamping the ribbon end under a base for the bow. A ribbon loop is expanded by a gripper foot between the collet and a ribbon guide on a pusher member which is then shifted into engagement with the collet to secure the loose end of the expanded loop. A thread spool and a thread-lying arm are revolved in a circle about the collet to lay tying thread about the secured loop, whereupon the pusher member and gripper foot are retracted and the collet is indexed for the making of the next loop.

Background of the invention

This invention relates to apparatus for tying ribbon bows of the type used as ornaments on gift packages and the like, and particularly to semi-automatic bow-tying apparatus in which the operator's intervention is limited to the starting of the machine and the removal of the finished bow.

Ribbon bows were tied heretofore by hand from continuous lengths of ribbon or assembled from individual loops prepared by mechanical devices. Both methods require much labor and are therefore relatively costly.

It is an object of the invention largely to eliminate human labor from the making of ribbon bows, and a more specific object to provide apparatus for making ribbon bows having loops of controlled length arranged in a controlled spatial relationship, and thus more regular than ribbon bows made by any but the most experienced human operators.

Summary of the invention

With these and other objects in view, as will hereinafter become apparent, the apparatus of the invention includes a clamping device for releasably clamping a terminal portion of a ribbon. A pusher member is arranged for movement by shifting means toward and away from the clamping device. Guides movably guide the ribbon to the clamping mechanism, one guide member being arranged spacedly adjacent the clamping mechanism.

A gripper foot releasably grips a portion of the ribbon intermediate the clamped terminal portion and the guide member, and is moved with the ribbon by an actuating mechanism away from the guide member and the clamping device until the gripped intermediate ribbon portion is expanded into a loop having one end secured to the clamping device and an initially loose end. An element on the pusher member secures the loose end to the clamping device when the pusher member is shifted toward the clamping device, and a tying member, such as a thread is laid about the secured ends of the expanded loop.

The operation of the shifting means for the pusher member, the actuating mechanism for the gripper foot, and the laying mechanism for the tying member are controlled in timed sequence by a control mechanism.

Other features, additional objects and many of the attendant advantages of this invention will be readily appreciated as the same becomes better understood by reference to the following detailed description of a preferred embodiment when considered in connection with the accompanying drawing.

Description of the preferred embodiment

Figure 1:
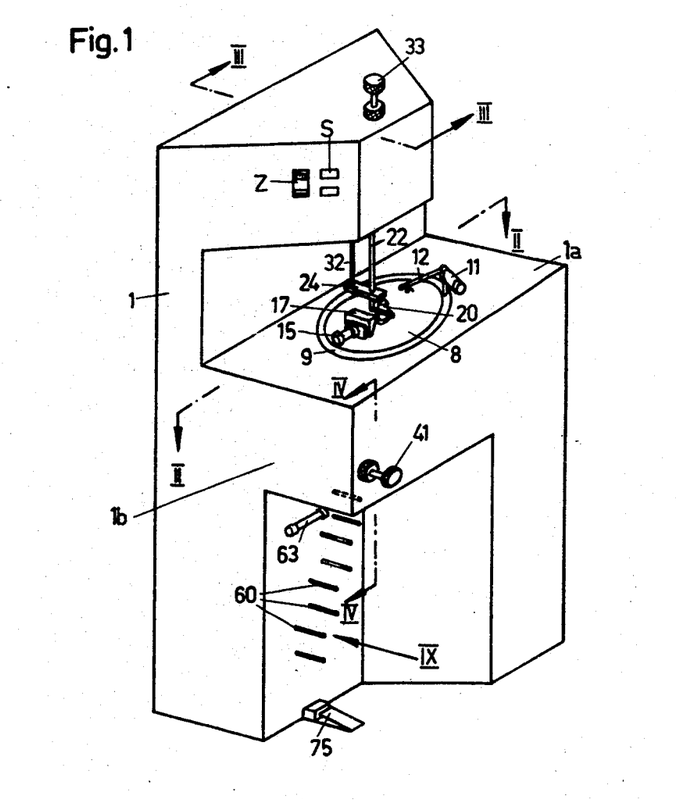
FIG. 1 shows a bow-making machine of the invention in a perspective view.

Referring now to the drawing in detail, and initially to FIG. 1, there is seen a semi-automatic bow making machine of the invention whose operating elements are partly concealed by a housing 1. The housing provides a working table 1a and has side walls 1b. A circular opening in the table 1a is partly covered by a concentrical circular covering plate 8 which leaves an annular gap 9 and whose top surface is flush with the top of the table 1a. A spool 11 of tying thread is upwardly offset from the common surface plane of the table 1a and the plate 8 above the gap 9 and is connected with a thread-laying arm 12 directed approximately toward the common axis of the plate 8 and the gap 9 in a horizontal plane above the table 1a.

A pneumatic cylinder 15 is mounted on the plate 8 to shift a pusher 17 horizontally toward the plate center. A vertical gripper rod 22 extends downward toward the latter from an upper portion of the housing 1 which also carries a counter Z and switches S. A horizontal link 24 fixedly connects the rod 22 to another rod 32 of a gripper actuating mechanism. Threadedly adjustable stops 33, 41 have heads which project from the top and front walls respectively of the housing 1.

An upright wall in a frontal recess of the base portion of the housing 1 carries a group of rotatable guide pins 60 and a horizontal pneumatic cylinder 63. A pedal 75 is arranged near the bottom of the same wall.

Figure 2:
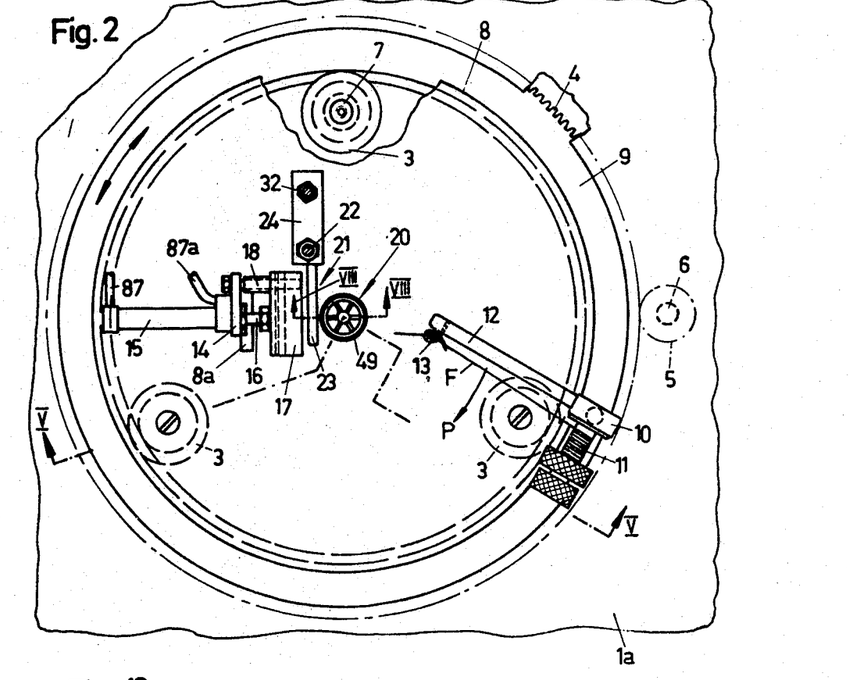
FIG. 2 shows the apparatus of FIG. 1 in fragmentary plan section on the line II—II.
Figure 5:
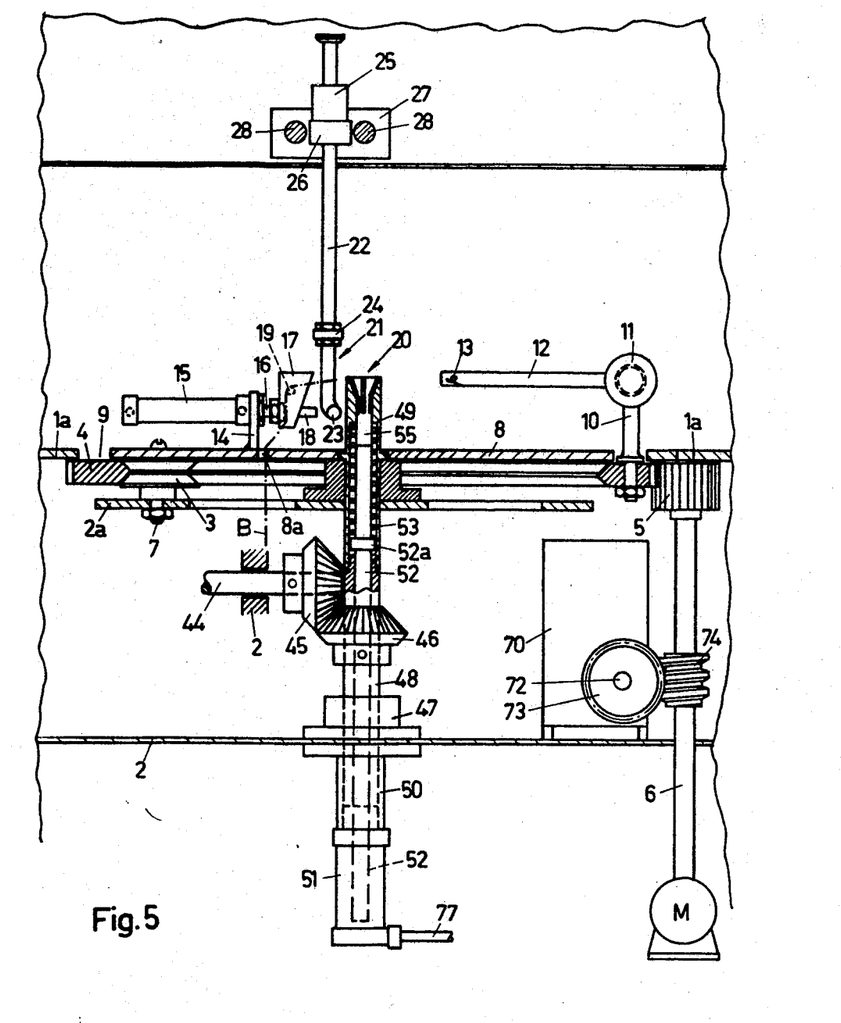
FIG. 5 shows the device of FIG. 2 in elevational section on the line V—V.

The housing 1 covers the supporting frame 2 of the machine partly seen in FIGS. 2 and 5. A horizontal plate portion 2a of the frame under the table 1a carries three guide rollers 3 on vertical stub shafts 7. An annular gear 4 is rotatably mounted on the machine frame 2 by means of the rollers 3 which engage the inner circumference of the gear. The gear 4 meshingly engages a pinion 5 on the long vertical output shaft 6 of an electric motor M. The aforementioned covering plate 8 is attached to the stub shafts 7.

A short column 10 projecting from the gear 4 through the gap 9 carries the spool 11 and the arm 12 whose free end is provided with a thread-engaging eye 13. A bracket 14 on the plate 8 near a guide slot 8A in the latter carries the cylinder 15 which is supplied with air or vented through pipes 87, 87a. The pusher 17 is attached to a piston rod 16 which projects from the cylinder 15. Rotation of the pusher 17 about the horizontal axis of the shifting cylinder 15 is prevented by a guide pin 18 attached to the bracket 14 and slidably received in a bore of the pusher 17. The pusher is a box-like sheet metal element open downwardly and away from the rod 16 to which its upright back wall is attached. The upright side walls of the pusher 17 are connected by a horizontal guide rod 19 and by the horizontal top wall of the pusher.

A clamping device 20 is axially centered in the plate 8. It cooperates normally with a gripper foot 21 which includes the aforementioned vertical rod 22 and a horizontal rod portion 23 at the lower end of the rod 22. The rod 22 is guided in a sleeve 25 on a projection 26 of a slide 27 which moves on two horizontal bars 28, as is better seen in FIGS. 3 and 6.

The bars 28 are fixedly mounted on the frame 2. The slide 27 is moved on the rods 28 by a piston rod 29 which projects from a double-acting hydraulic cylinder 30 supplied with air under pressure and vented through pipes 85, 85a. The slide 27 carries another double-acting pneumatic cylinder 31 supplied with air or vented through pipes 86, 86a to extend or retract its piston rod 32 described above and attached to the rod 22 of the gripper 21. When the sleeve 25 is shifted into the position shown in chain-dotted outline in FIG. 3, the upward movement of the rod 22 by the cylinder 31 is limited by the above-mentioned stop 33.

Figure 4:
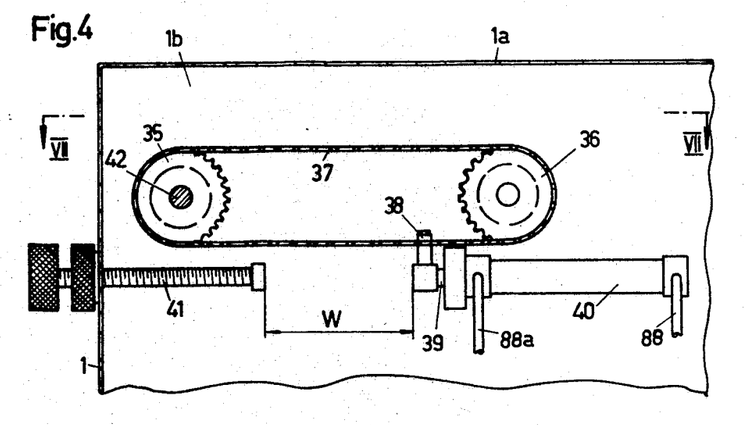
FIG. 4 shows another portion of the apparatus in front-elevational section on the line IV—IV in FIG. 1.
Figure 7:
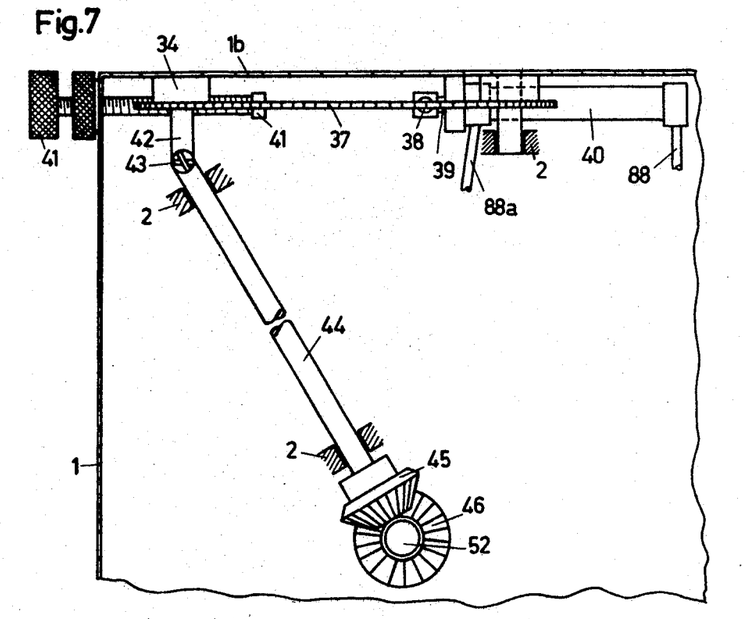
FIG. 7 shows the device of FIG. 4 in plan section on the line VII—VII.
Figure 8:
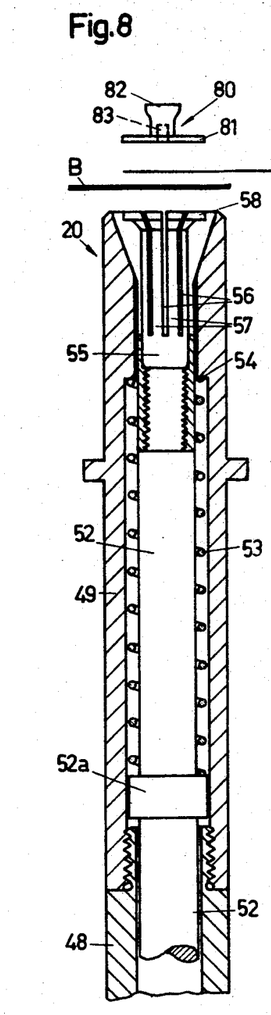
FIG. 8 is an enlarged view of a portion of the device of FIG. 5, taken in section on the line VIII—VIII in FIG. 2.

Referring next to FIGS. 4 and 7, there are seen two sprockets 35, 36 mounted on the side wall 1b of the housing 1 below the table 1a. They are connected by a link chain 37 and may be oscillated by a transverse pin 38 on a piston rod 39 which projects horizontally from a double-acting pneumatic indexing cylinder 40 supplied with compressed air and vented by pipes 88, 88a. The travel of the piston rod 39 is limited by the aforementioned threaded stop 41.

The sprocket 35 is attached to its shaft 42 by means of an overrunning coupling 34. A universal joint 43 connects the shaft 42 with a shaft 44 journaled in the frame 2 and carrying a bevel gear 45 at its end remote from the joint 43. The gear 43 meshes with a bevel gear 46 fixedly attached to a tubular upright shaft 48, as is better seen in FIG. 5.

The shaft 48 is journaled in bearings 47, 50 on the frame 2 and carries the aforementioned clamping device 20, best understood by joint consideration of FIGS. 5, 8, 9 and 10. A pneumatic cylinder 51 is attached to the bearing 50 and is provided with a plunger 52 which extends upward through the shaft 48 into a tube 49 coaxially attached to the top of the shaft 49 and having a main bore portion of slightly greater diameter. A fixed annular projection 52a on the plunger 52 abuts against the annular top face of the shaft 48 to limit downward movement of the plunger under the pressure of a helical compression spring 53 in the main bore portion of the tube 49 when air is vented from the cylinder 51 through a pipe 77. The top of the spring 53 abuts against a shoulder 54 separating the main bore portion of the tube 49 from its upper portion which flares in an axial upward direction at 49a.

A partly tubular collet 55 is threadedly attached to the top end of the plunger 52 and conforms to the shape of the bore in the tube 49 when in the retracted position seen in FIGS. 5, 8, 9 and 10. Axial slots 56 divide the upper end portion of the collet 55 into eight spring tongues 57 which tend to move outwardly away from the collet axis when released by the tube 49 by axially upward movement of the plunger 52. The bore in the slotted collet 55 has a conically flaring upper orifice whose wall is formed with an undercut annular groove 58.

Figure 9:
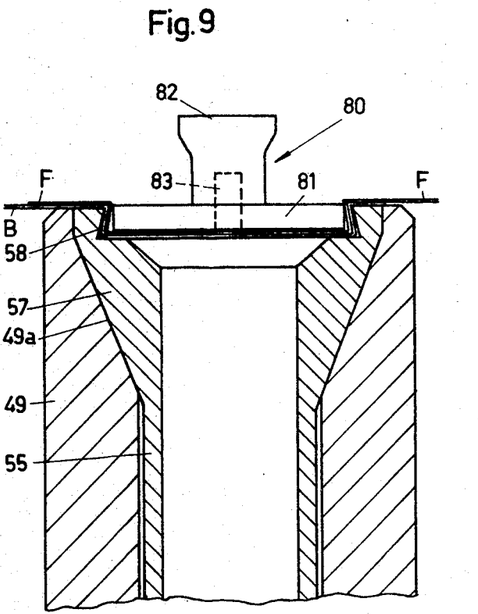
FIG. 9 shows a portion of the device of FIG. 8 on a yet larger scale.
Figure 10:
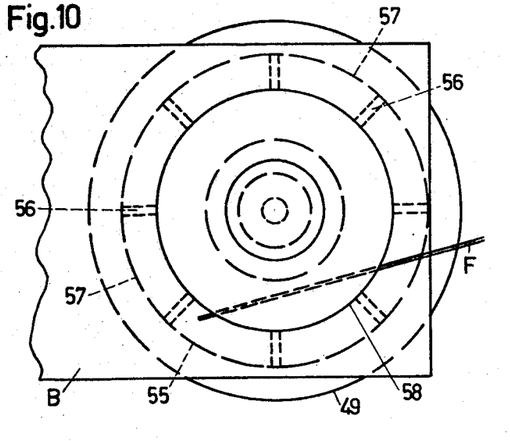
FIG. 10 is a plan view of the device of FIG. 9.

The collet orifice is dimensioned to receive the base 80 for a bow to be formed on the clamping device from a ribbon B tied by a thread F, the thread being drawn from the aforementioned spool 11. The base 80 has a circular plate portion 81 which fits into the groove 58 with sufficient clearance to accommodate the ribbon B between the plate and the collet orifice. The base 80 has a head 82 of cylindrical cross section which flares upwardly away from the plate 81. An axial blind bore 83 extends through the plate 81 into the head 82.

Figure 11:
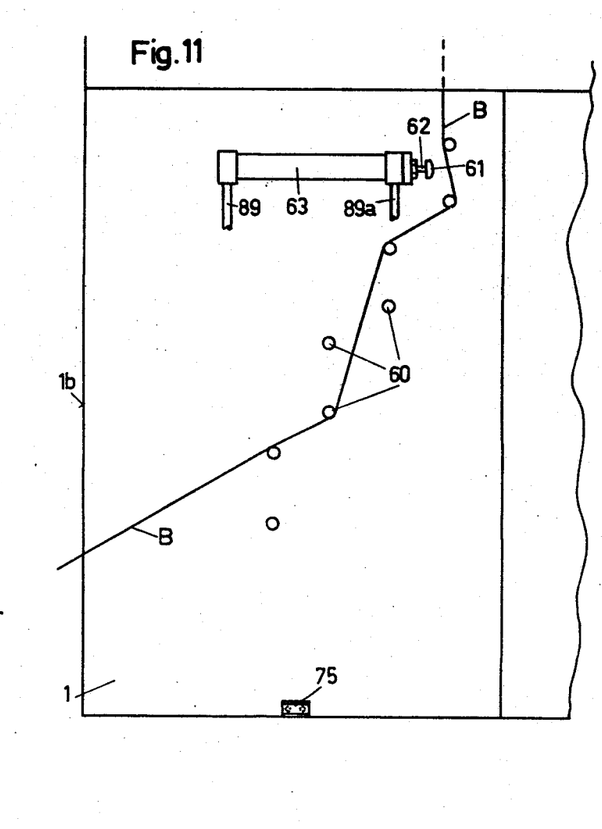
FIG. 11 shows a portion of the apparatus of FIG. 1 in front elevation taken in the direction of the arrow XI.
Figure 12:
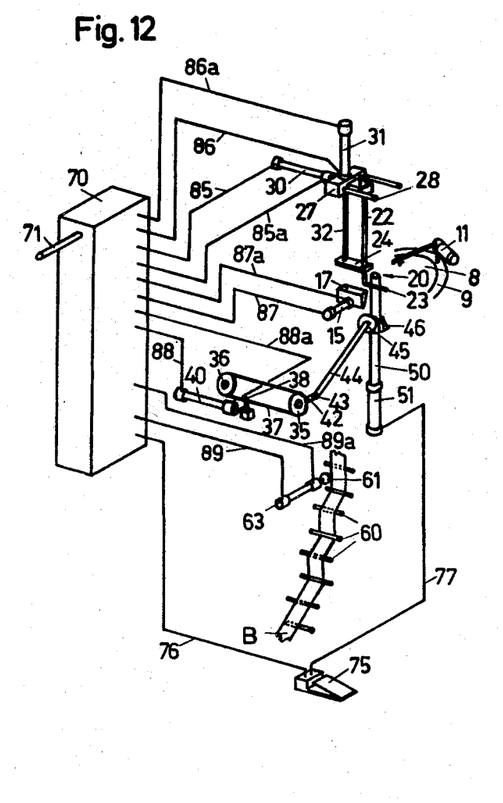
FIG. 12 diagrammatically illustrates the pneumatic circuit of the machine of FIG. 1.

Reverting to FIG. 5, there is seen the casing 70 of a distributor valve assembly, not shown in detail and conventional in itself, whose valves are operated by cams on a common shaft geared to a drive shaft 72 which partly projects from the casing 70 and carries a worm wheel 73 in meshing engagement with a worm 74 on the motor shaft 6. As is shown in FIG. 12 partly by conventional symbols, the valves in the casing 70 are supplied with compressed air through a line 71 from a pump or storage tank, and control the supply of compressed air to the aforementioned double-acting pneumatic cylinders 15, 30, 31 and 40, and the venting of the cylinders to the atmosphere in a conventional manner. A set of valves in the casing 70 also controls pipes 89, 89a to the double-acting pneumatic cylinder 63, best seen in FIG. 11, which is mounted adjacent guide pins 60 on the upright wall of the housing 1 in the aforementioned frontal recess. The rod 62 of the non-illustrated piston in the cylinder 63 has an enlarged rounded head directed toward a portion of the ribbon B between two guide pins 60.

The cylinder 51 is supplied with compressed air from the line 71 by a pipe 76 connecting the casing 70 with a valve in the pedal 75, the valve being connected by the pipe 77 to the cylinder 51 and venting the cylinder 51 to the atmosphere unless the pedal is pushed down by the operator.

Figure 13:
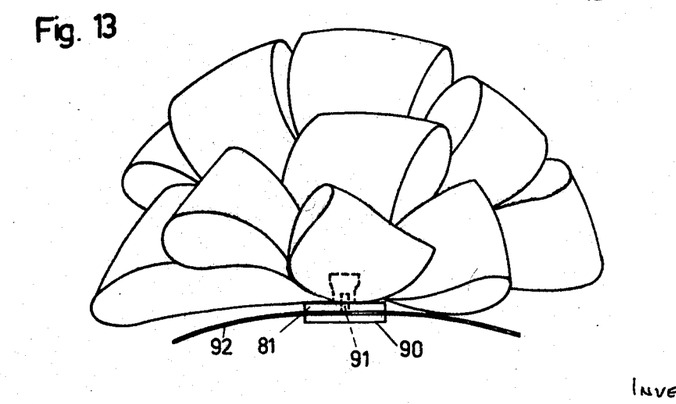
FIG. 13 shows a bow made on the machine of FIG. 1 in side elevation.

FIG. 13 shows a finished bow assembled from loops of the ribbon B on the base 80 of which only the plate portion 81 is exposed on the bow. A snap fastener 90 has a pin 91 which projects through a hole in a ribbon 92 into the aforementioned blind bore of the base 80 to attach the bow to the ribbon.

Figure 5A:
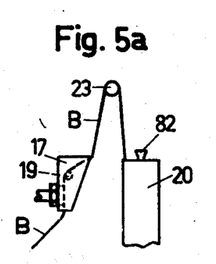
FIGS. 5a, 5b, 5c show elements of the apparatus of FIG. 5 in different operating positions.

The bow is made on the aforedescribed apparatus in the following manner, partly also illustrated in FIGS. 5a, 5b and 5c:

Before starting the machine, the operator threads the end of a ribbon B from a non-illustrated supply reel loosely over and under the pins 60, upward through the housing 1, the slot 8a in the plate 8, over the rod 19 in the pusher 17 until the ribbon end covers the orifice of the collet 55. The free end of the thread F is pulled from the spool 11 through the eye 13 and placed under the ribbon B, as seen in FIG. 10. The operator then depresses the pedal 75 to raise the plunger 52, whereby the collet 55 partly rises above the tube 49, and its tongues 57 are spread apart sufficiently to permit the plate 81 to be placed on top of the ribbon end and to be pushed into the groove 58. When the pedal 75 is thereafter released, the tongues 57 clamp the base 80 and ribbon B in the collet 55 as shown in FIG. 9.

The operator then starts the motor M by means of the switch S, and the machine takes over to make a complete bow in an automatic operation in which the gear 4 and the elements supported thereon revolve about the vertical axis of the clamping device 20 a complete turn while all valves in the casing 70 are operated in timed sequence with the rotation of the shaft 6.

Figures 3, 6:
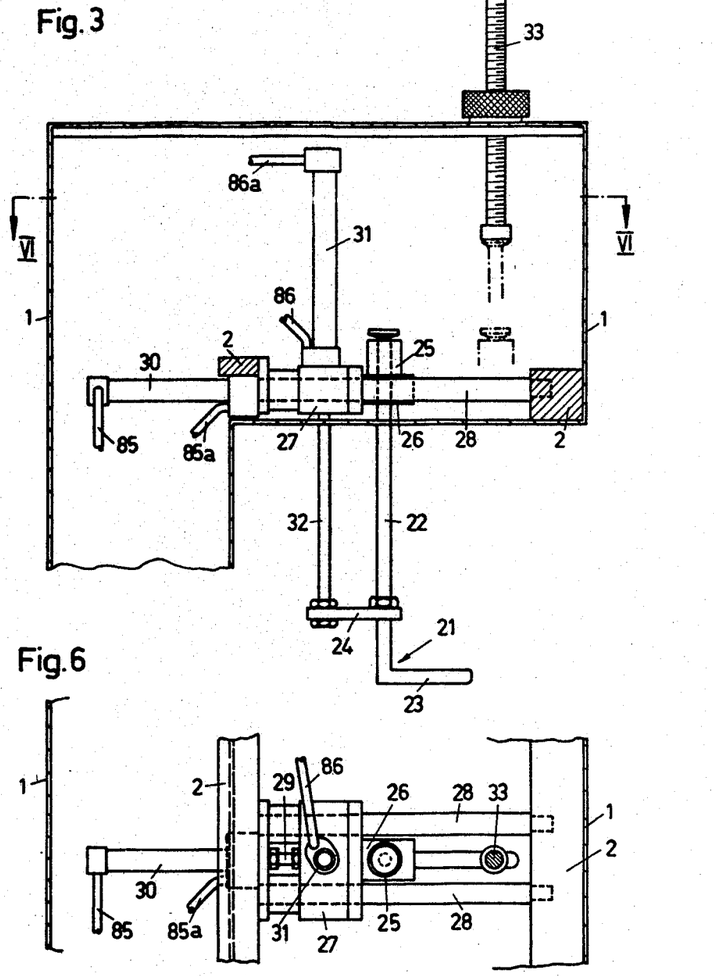
FIG. 3 shows a portion of the apparatus of FIG. 1 in side-elevational section on the line III—III.
FIG. 6 illustrates the device of FIG. 3 in plan section on the line VI—VI.

The cylinder 30 first receives compressed air to shift the gripper foot 21 from the position shown in FIG. 3 in fully drawn line into the position partly shown in chain-dotted outline and also seen in FIGS. 1, 2 and 5. The horizontal rod portion 23 is located under the intermediate part of the ribbon B running from the guide rod 19 to the base 80.

The cylinder 31 is energized next to lift the gripper foot 21 to a position defined by abutment of the rod 22 with the stop 33. A sufficient length of ribbon B is pulled by the rod portion 23 through the pusher 17 to form a first, expanded ribbon loop which initially is open at the bottom, as seen in FIG. 5a.

Figure 5B:
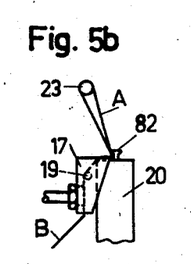

When the shifting cylinder 15 next receives compressed air, the pusher 17 moves toward the center of the plate 8 until its top wall abuts against the head 82 of the base 80, thereby pulling additional ribbon over the pins 60, and securing an end of the closed ribbon loop A against the head 82, as is seen in FIG. 5b, the other end of the loop being clamped in the collet 55.

The cylinder 63 thereafter pushes its rounded piston rod head 61 against the ribbon B between two pins 60 to draw the length of ribbon required for the next loop from the non-illustrated reel while the forward portion of the ribbon is secured by the pusher 17.

At this stage of operation, the gear 4 has revolved the arm 12 and spool 11 approximately 270° about the gear axis so that the tying thread F extends in three quarters of a circle about the head 82 of the base 80, and secures the ribbon loop A in its closed condition to the base 80.

Figure 5C:
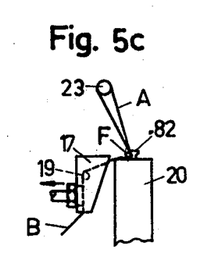

The cylinders 15, 30, 31 and 63 thereafter return the associated piston rods to their starting positions so that the pusher 17 is withdrawn as seen in FIG. 5c, and the horizontal rod portion 23 is withdrawn from the loop A and lowered to a position below the rod 19 in the pusher 17.

While the gear 4 completes its first turn, the indexing cylinder 40 moves its piston rod 39 against the threaded abutment 41 and thereby indexes the clamping device 20 and the ribbon loop A formed thereon through an angle whose magnitude may be controlled by setting the stroke W of the rod 39 by means of the stop 41. When the cylinder 40 thereafter retracts its piston rod, the shaft 42 is not moved by the overrunning coupling 34.

Additional ribbon loops are thereafter formed in automatic cycles of valve operations as described above in which air is admitted to one compartment of the cylinder 15, 30, 31, 40, 63 while the other compartment is being vented. The number of cycles is counted on the counter Z driven by the motor M through non-illustrated gearing. The counter shuts the switch S off when the number of counted cycles equals a number which may be set initially on the counter in a conventional manner. When the machine shuts itself down, the ribbon bow is assembled on the base 80.

The operator, alerted by the stopping of the machine, cuts the ribbon B and the thread F and ties the latter into a knot if necessary. The tying of a knot can be avoided by the use of crimp yarn which unravels when cut and thereby increases in effective diameter so that it is clamped automatically between the lowermost ribbon doop and the plate 81 of the base 80.

When the pedal 75 is briefly depressed, the finished bow is released and can be removed from the machine with its base 80. The base may be fastened to a ribbon 92 for a gift package or the like by means of the snap fastener 90. The operator places the newly cut ends of the ribbon B and the thread F over the clamping device 20, inserts a base 80 with the ribbon and thread ends in the collet 55, and starts the motor M for the production of the next bow.

The position of the threaded stop 33 determines the length of the individual ribbon loops A in the bow. If so desired, the loop length may be varied within the bow so as to make the bottom loops longer than the top loops or in any other desired manner by adjusting the stop 33 during the run of the machine. If a series of identical bows with loops of varying length is to be produced, the stop 33 may be adjusted automatically. It may be made longitudinally slidable in the housing 1 and shifted by a cam against a return spring, the cam being driven by the motor M through suitable gearing in synchronization with the gear 4 and the valves in the casing 70.

The angular offset between consecutively prepared loops A of the bow is controlled by the threaded stop 41, and the angle may be varied automatically during the making of a bow in the manner indicated in the preceding paragraph.

The insertion and cutting of the ribbon B and thread F may be automatized if so desired, the necessary implements being known to those skilled in the art. It has been found, however, that the semi-automatic apparatus illustrated and described above can be operated by unskilled personnel at low cost, thus making fully automatic operation unattractive at this time.

What is claimed is:
1. Apparatus for tying a continuous ribbon into a bow comprising, in combination:
 (a) clamping means for releasably clamping a terminal portion of said ribbon;
 (b) a pusher member;
 (c) shfting means for shifting said pusher member toward and away from said clamping means;
 (d) guide means for movably guiding said ribbon to said clamping means,
  (1) said guide means including a guide member spacedly adjacent said clamping means;
 (e) gripper means for releasably gripping a portion of said ribbon intermediate a terminal portion thereof clamped by said clamping means and said guide member;
 (f) actuating means for moving said gripper means away from said guide member and said clamping means until said intermediate portion is expanded into a loop having one end secured to said clamping means and another end,
  (1) securing means on said pusher member for securing said other end to said clamping means when said pusher member is shifted toward said clamping means; and
 (g) laying means for laying a tying member about the secured ends of the expanded loop.

2. Apparatus as set forth in claim 1, further comprising control means for controlling operation of said shifting means, said actuating means, and said laying means in timed sequence.

3. Apparatus as set forth in claim 2, further comprising means for varying the distance moved by said gripper means away from said guide member and said clamping means and for thereby varying the length of said expanded loop.

4. Apparatus as set forth in claim 2, wherein said guide member and said clamping means constitute a pair of operating elements of said apparatus, the apparatus further comprising indexing means for angularly indexing one of said elements relative to an axis through said clamping means and transverse to the direction of spacing of said guide member from said clamping means, said control means including means for controlling the operation of said indexing means in timed sequence with said shifting means, said actuating means and said laying means.

5. Apparatus as set forth in claim 4, further comprising means for varying the angle of each indexing movement of said one element.

6. An apparatus as set forth in claim 4, further comprising a support, said axis being substantially fixed relative to said support, said pusher member being mounted on said support for movement by said shifting means in a fixed path, said gripper means being mounted on said support for movement by said actuating means substantially in the direction of said axis, and said laying means including a laying member mounted on said support for movably engaging said tying member, and revolving means for moving said laying member in a path extending about said axis, said control means controlling operation of said revolving means in timed sequence with said shifting means, said actuating means and said indexing means.

7. An apparatus as set forth in claim 6, wherein said laying means further comprise means secured to said laying member for holding a supply of said tying member.

8. An apparatus as set forth in claim 2, wherein said laying means include a laying member adapted movably to engage said tying member, said laying member and said clamping means constituting a pair of operating elements of said apparatus, and revolving means for revolving one element of said pair about an axis through said clamping means, said laying member being radially spaced from said axis, said control means controlling operation of said revolving means in said timed sequence.

9. An apparatus as set forth in claim 8, wherein said actuating means move said gripper means away from said guide member and said clamping means substantially in the direction of said axis, the actuating means further including means for withdrawing said gripper means from said expanded loop transversely of said axis, and for there after moving said gripper means toward said guide member and said clamping means.

10. An apparatus as set forth in claim 9, wherein said clamping means include collet means formed with a recess therein, said collet means being movable between a retracted position and a reelasing position, and a base member dimensioned for insertion in said recess in said releasing position of the collet means for clamping said end portion between said base member and said collet means, the base member and the clamped end portion being retained in said recess by said collet means in the retracted position of the latter.

11. An apparatus as set forth in claim 10, further comprising indexing means for angularly indexing said collet means about said axis, said control means including means for controlling operation of said indexing means in timed sequence with said shifting means, said actuating means, and said laying means.

12. An apparatus as set forth in claim 2, wherein said guide member is mounted on said pusher member for shifting movement therewith.

References Cited

UNITED STATES PATENTS

| | | | |
|---|---|---|---|
| 2,884,169 | 4/1959 | Sperry | 223—46 |
| 2,933,223 | 4/1960 | Kravig et al. | 223—46 |
| 2,982,452 | 5/1961 | Anderson | 223—46 |
| 3,396,880 | 8/1968 | Lopata | 223—46 |
| 3,409,190 | 11/1968 | Bachman et al. | 223—46 |
| 3,415,429 | 12/1968 | Lopata | 223—46 |

MERVIN STEIN, Primary Examiner

GEORGE V. LARKIN, Assistant Examiner